United States Patent
Ghannam et al.

(10) Patent No.: US 11,615,426 B2
(45) Date of Patent: Mar. 28, 2023

(54) VEHICLE WHEEL CUSTODY

(71) Applicant: Ford Global Technologies, LLC, Dearborn, MI (US)

(72) Inventors: Mahmoud Yousef Ghannam, Canton, MI (US); Pramita Mitra, West Bloomfield, MI (US); Brian Bennie, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 257 days.

(21) Appl. No.: 16/573,968

(22) Filed: Sep. 17, 2019

(65) Prior Publication Data
US 2021/0081958 A1   Mar. 18, 2021

(51) Int. Cl.
| | | |
|---|---|---|
| *G06Q 30/00* | (2012.01) | |
| *G07C 5/08* | (2006.01) | |
| *G06F 16/245* | (2019.01) | |
| *G01M 17/013* | (2006.01) | |
| *G06F 16/23* | (2019.01) | |
| *G06Q 30/018* | (2023.01) | |
| *H04L 9/32* | (2006.01) | |
| *H04L 9/00* | (2022.01) | |

(52) U.S. Cl.
CPC ........ *G06Q 30/018* (2013.01); *G01M 17/013* (2013.01); *G06F 16/2379* (2019.01); *G06F 16/245* (2019.01); *G07C 5/085* (2013.01); *H04L 9/3239* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 10,158,480 | B1* | 12/2018 | Winklevoss | H04L 9/3247 |
| 10,773,557 | B1* | 9/2020 | Mast | G01B 11/22 |
| 2013/0159201 | A1* | 6/2013 | Kirian | G06Q 50/04 |
| | | | | 705/305 |
| 2016/0189114 | A1* | 6/2016 | Cattone | G06Q 10/20 |
| | | | | 705/28 |

(Continued)

FOREIGN PATENT DOCUMENTS

| | | |
|---|---|---|
| CN | 107730279 A | 2/2018 |
| CN | 108001428 A | 5/2018 |

(Continued)

OTHER PUBLICATIONS

P. Fraga-Lamas and T. M. Fernández-Caramés, "A Review on Blockchain Technologies for an Advanced and Cyber-Resilient Automotive Industry," Jan. 25, 2019, IEEE Access, vol. 7, pp. 17578-17598. (Year: 2019).*

*Primary Examiner* — Sarah M Monfeldt
*Assistant Examiner* — Michael J. Monaghan
(74) *Attorney, Agent, or Firm* — Brandon Hicks; Bejin Bieneman PLC (57) ABSTRACT

An electronic ledger stores vehicle data including a distance travelled by a vehicle wheel assembly during operation and a number of instances of repair of the vehicle wheel assembly. A health status of the vehicle wheel assembly can be determined based on the vehicle data. Transfer of custody of the vehicle wheel assembly from a first entity to a second entity is based on the health status of the vehicle wheel assembly. Data indicating the custody transfer can be stored to the electronic ledger.

20 Claims, 4 Drawing Sheets

(56) References Cited

U.S. PATENT DOCUMENTS

| | | | |
|---|---|---|---|
| 2018/0018723 A1 | 1/2018 | Nagla et al. | |
| 2018/0268532 A1* | 9/2018 | Wang | G01M 17/027 |
| 2018/0342036 A1* | 11/2018 | Zachary | H04L 9/0637 |
| 2019/0013948 A1* | 1/2019 | Mercuri | G06F 16/27 |
| 2019/0158270 A1* | 5/2019 | Berti | H04L 9/3239 |
| 2019/0378352 A1* | 12/2019 | Dey | G07C 5/0841 |
| 2020/0023846 A1* | 1/2020 | Husain | H04W 4/027 |
| 2020/0210623 A1* | 7/2020 | Bueno | H04L 9/3239 |
| 2020/0388091 A1* | 12/2020 | Ropel | H04L 9/0637 |
| 2020/0402391 A1* | 12/2020 | Dutta | G08G 1/205 |

FOREIGN PATENT DOCUMENTS

| | | |
|---|---|---|
| JP | 2019029988 A | 2/2019 |
| KR | 20180107339 A | 10/2018 |

* cited by examiner

VEHICLE WHEEL CUSTODY

BACKGROUND

Digital data collected and/or stored in vehicles can be important for monitoring and maintaining vehicle components, such as vehicle wheels.

DETAILED DESCRIPTION

A method includes storing in an electronic ledger vehicle data including a distance travelled by a vehicle wheel assembly during operation and a number of instances of repair of the vehicle wheel assembly. The method further includes determining a health status of the vehicle wheel assembly based on the vehicle data. The health status being one of healthy or unhealthy. The method further includes authorizing transfer of custody of the vehicle wheel assembly from a first entity to a second entity based on the health status of the vehicle wheel assembly, and writing data indicating the custody transfer to the electronic ledger.

The electronic ledger stores data identifying a current entity that has custody of the vehicle wheel assembly.

The method can further includes authorizing the transfer of custody based further on querying the electronic ledger to determine that the current entity has custody of the vehicle wheel assembly.

The electronic ledger stores data identifying a prior entity that previously had custody of the vehicle wheel assembly.

The method can further include initiating the transfer based on the vehicle wheel assembly being unhealthy.

The method can further include rejecting a request for the transfer of custody to the second entity based on the vehicle wheel assembly being unhealthy, wherein the second entity is a vehicle.

The method can further include rejecting a request for the transfer of custody from the first entity based on the vehicle wheel assembly being healthy, wherein the first entity is a vehicle.

One of the first entity and the second entity is a vehicle.

The health status is unhealthy when at least one of the distance travelled by the vehicle wheel assembly during operation and the number of instances of repair of the vehicle wheel assembly exceeds a respective threshold.

The method can further include determining the health status based on a presence or absence of structural damage to the vehicle wheel assembly.

A system includes a computer including a processor and a memory, the memory storing instructions executable by the processor to store in an electronic ledger vehicle data including a distance travelled by a vehicle wheel assembly during operation and a number of instances of repair of the vehicle wheel assembly. The instructions further include instructions to determine a health status of the vehicle wheel assembly based on the vehicle data. The health status being one of healthy or unhealthy. The instructions further include instructions to authorize transfer of custody of the vehicle wheel assembly from a first entity to a second entity based on the health status of the vehicle wheel assembly and write data indicating the custody transfer to the electronic ledger.

The electronic ledger stores data identifying a current entity that has custody of the vehicle wheel assembly.

The instructions can further include instructions to authorize the transfer of custody based further on querying the electronic ledger to determine that the current entity has custody of the vehicle wheel assembly.

The electronic ledger stores data identifying a prior entity that previously had custody of the vehicle wheel assembly.

The instructions can further include instructions to initiate the transfer based on the vehicle wheel assembly being unhealthy.

The instructions can further include instructions to reject a request for the transfer of custody to the second entity based on the vehicle wheel assembly being unhealthy, wherein the second entity is a vehicle.

The instructions can further include instructions to reject a request for the transfer of custody from the first entity based on the vehicle wheel assembly being healthy, wherein the first entity is a vehicle.

One of the first entity and the second entity is a vehicle.

The health status is unhealthy when at least one of the distance travelled by the vehicle wheel assembly during operation and the number of instances of repair of the vehicle wheel assembly exceeds a respective threshold.

The instructions can further include instructions to determine the health status based on a presence or absence of structural damage to the vehicle wheel assembly.

Further disclosed herein is a computing device programmed to execute any of the above method steps. Yet further disclosed herein is a computer program product, including a computer readable medium storing instructions executable by a computer processor, to execute an of the above method steps.

A plurality of computers 110, 140 generate and maintain a blockchain ledger 150 for managing custody of a vehicle wheel assembly 125 for a vehicle 105. Each of the plurality of computers 110, 140 is communicatively coupled in a blockchain network 111. For example, the computers 110, 140 may be computing devices 140 external to the vehicle 105 and a vehicle computer 110. The blockchain network 111 includes distributed computers 110, 140 as a peer-to-peer network or a peer-to-peer network with a supervisory computer. The computers 110, 140 authorized to participate in the blockchain network 111 are listed in the blockchain ledger 150.

In this disclosure, the term "network" in the context of a blockchain network 111 means a network formed by computers 110, 140, i.e., a blockchain network means the computers 110, 140 that form the blockchain, including links to each other stored by the computers 110, 140. On the other hand, a "network" in the context of devices communicating with each other, e.g., ECUs and/or devices communicating via a vehicle network and/or wide area network 135, means a physical wired and/or wireless network comprising conventional networking hardware, media, protocols, etc.

Custody of the vehicle wheel assembly 125 can be stored as data blocks in the blockchain ledger 150. The blockchain ledger 150 is one example of an electronic ledger. An electronic ledger is a distributed database. "Distributed" in this context means that copies of the database are maintained by multiple entities with access to the electronic ledger, e.g., to verify data on the ledger, to store data to the ledger, etc. The data blocks stored within the blockchain ledger 150 are linked in chains by hashes.

A blockchain ledger 150 is an electronic ledger maintained in each of a plurality of computers 110, 140 that form the blockchain network 111, each storing shared data based on generation of hashes for blocks of data. A hash in the present context is a one-way encryption of data having a fixed number of bits. An example of hash encryption is SHA-256. The hashes provide links to blocks of data by identifying locations of the block of data in storage (digital memory), for example by use of an association table mapping the hashes of the storage locations. An association table provides a mechanism for associating the hash (which may also be referred to as a hash key) with an address specifying a physical storage device either in a vehicle or a stationary location. The hash for the block of data further provides a code to verify the data to which the hash links. Upon retrieving the block of data, a computer can recompute the hash of the block of data and compare the resulting hash with the hash providing the link. In the case that the recomputed hash matches the linking hash, the computer can determine that the block of data is unchanged. Conversely, a recomputed hash that does not match the linking hash indicates that the block of data or the hash has been changed, for example through corruption or tampering. The hash providing the link to a block of data may also be referred to as a key or a hash key. An example structure of a blockchain ledger 150 is discussed below in reference to FIG. 2.

Figure 1A:
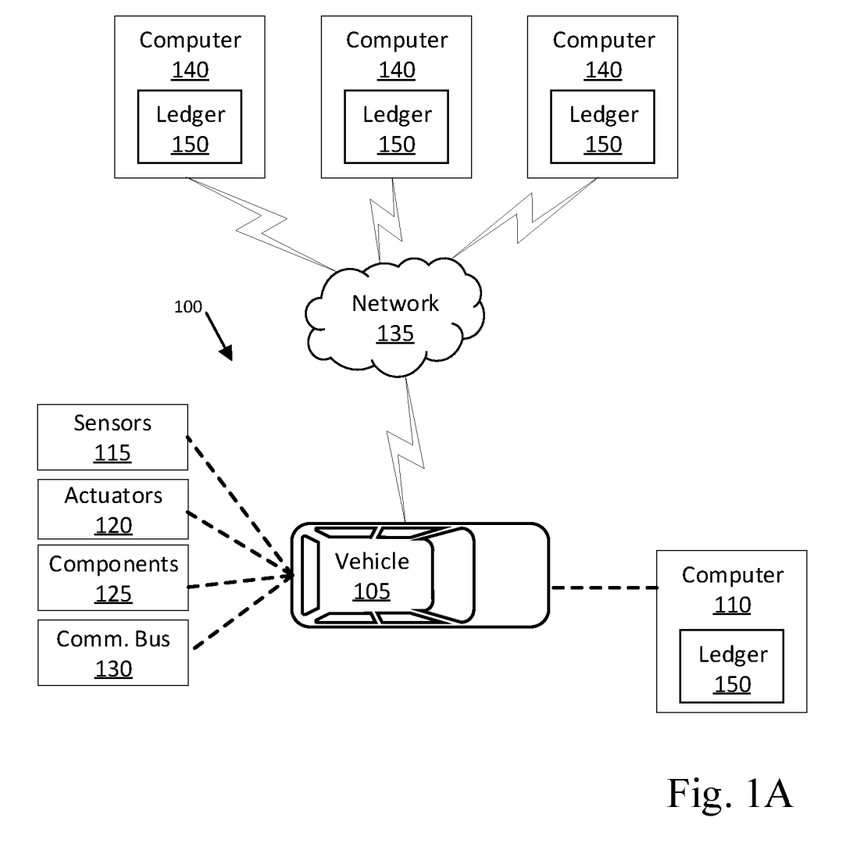
FIG. 1A is a block diagram illustrating an example system to maintain an electronic ledger.

FIG. 1A is a block diagram of an example system 100 that includes an instance of a blockchain ledger 150 hosted on a vehicle computer 110 and at least one computing device 140 external to a vehicle 105. The vehicle computer 110 is programmed to store vehicle data in the blockchain ledger 150. The vehicle data includes a distance travelled by a vehicle wheel assembly 125 during operation and a number of instances of repair of the vehicle wheel assembly 125. At least one of the vehicle computer 110 and the at least one computing device 140 is programmed to determine a health status of the vehicle wheel assembly 125 based on the vehicle data. The health status is one of healthy or unhealthy. At least one of the vehicle computer 110 and the at least one computing device 140 is further programmed to authorize transfer of custody of the vehicle wheel assembly 125 from a first entity to a second entity based on the health status of the vehicle wheel assembly 125. At least one of the vehicle computer 110 and the at least one computing device 140 is programmed to write data indicating the custody transfer to the electronic ledger, e.g., the blockchain ledger 150. Herein, "custody" means physical possession of the vehicle wheel assembly 125.

Vehicle 105 wheel assemblies 125 can be removed and replaced. Advantageously, the electronic ledger records changes of custody of the vehicle wheel assembly 125, which assists in verifying the authenticity of the vehicle wheel assembly 125 replacement wheel assemblies. Further, the electronic ledger can record the health status of the vehicle wheel assembly 125, which allows the computers 110, 140 to authorize installation of healthy vehicle wheel assemblies 125 onto the vehicle 105.

The vehicle 105 includes a vehicle computer 110, sensors 115, actuators 120, vehicle components 125, and a vehicle communications bus 130. Via a network 135, the communications bus 130 allows the vehicle computer 110 to communicate with the computing devices 140 external to the vehicle 105.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle 105 network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle 105 communication network may be used for communications between devices represented as the vehicle computer 110 in this disclosure. Further, as mentioned below, various controllers and/or sensors 115 may provide data to the vehicle computer 110 via the vehicle 105 communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

The vehicle 105 includes a plurality of wheel assemblies 125. Each wheel assembly 125 includes a tire and a wheel supporting the tire. Each wheel assembly 125 typically further includes additional parts such as a valve stem and one or more sensors 115, e.g., a tire pressure sensor, a wheel speed sensor, etc. The wheel assemblies 125 may be located at various positions on the vehicle 105, e.g., one at a right-front corner, one at a left-front corner, one at a right-rear corner, and one at a left-rear corner. Some of the wheel assemblies 125, such as the front wheel assemblies 125, may be moveable to change a steering angle of the vehicle 105, e.g., angling toward a right or left to control a direction of travel of the vehicle 105. Each wheel assembly 125 includes an identifier. Herein, an "identifier" is a set of data, e.g., an alphanumeric string of data, that substantially uniquely identifies a thing, e.g., an entity, a vehicle 105, a vehicle wheel assembly 125, etc.

In addition, the vehicle computer 110 may be configured for communicating via a vehicle-to-vehicle communication bus 130 or interface with devices outside of the vehicle 105, e.g., through a vehicle-to-vehicle (V2V) or vehicle-to-infrastructure (V2X) wireless communications to another vehicle, and/or to the computing devices 140 external to the vehicle 105 (typically via direct radio frequency communications). The communications bus 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications bus 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote devices, including the computing devices 140 external to the vehicle 105. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 1B:
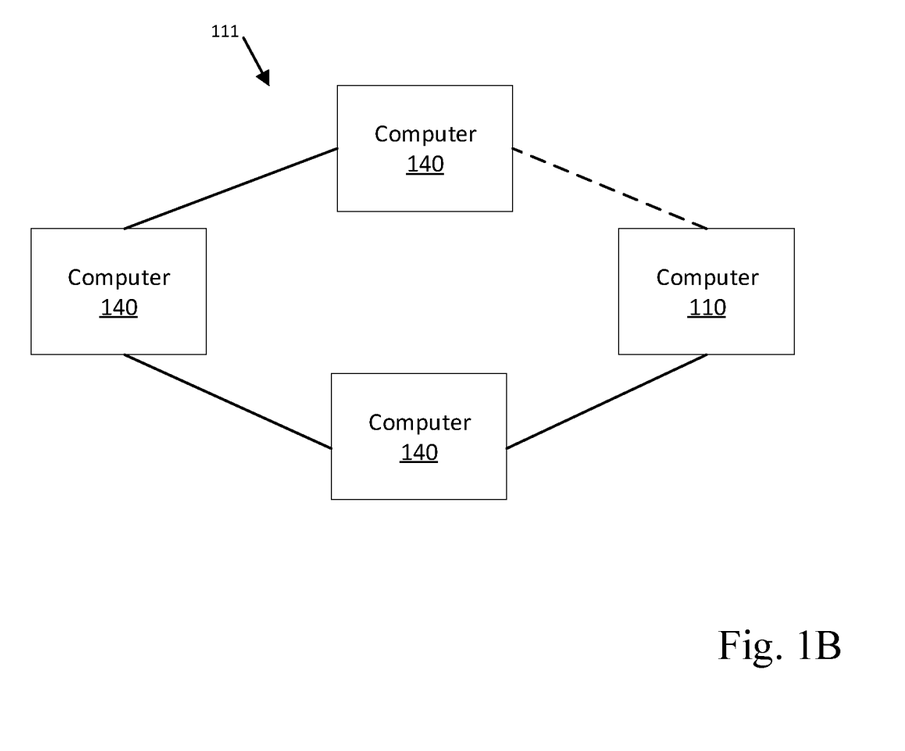
FIG. 1B is a block diagram illustrating an example blockchain network.

The blockchain network 111 (as shown in FIG. 1B) includes the plurality of computers 110, 140, i.e., in a peer-to-peer network, with each computer 110, 140 in the peer-to-peer network including links to other computers 110, 140 in the blockchain network 111. Computers 110, 140 in the blockchain network 111 may be specified by, e.g., the vehicle 105 owner, the vehicle 105 manufacturer, etc., and may be recorded in the blockchain ledger 150.

The blockchain ledger 150 is a distributed blockchain ledger. That is, each computer 110, 140 stores, e.g., in a memory, one copy of the blockchain ledger 150. The computers 110, 140 may, for example, receive data blocks from other computers 110, 140 and may upload the data blocks to their respective copies of the blockchain ledger 150, i.e., store the respective data blocks in respective storage locations in their respective blockchain ledgers 150 such that each data block is linked to one respective previous data block. The data blocks may be generated based on requests, which may be submitted, for example, by a computer 110, 140. Each data block may specify a transfer of custody of the vehicle wheel assembly 125. In other words, the blockchain ledger 150 tracks custody of the vehicle wheel assembly 125. That is, the blockchain ledger 150 stores data identifying a current entity that has custody of the vehicle wheel assembly 125 and data identifying a prior entity that previously had custody of the vehicle wheel assembly 125. Each computer 110, 140 can compare its stored blockchain data, i.e., linked data blocks, to blockchains stored by other blockchain computers 110, 140 to verify the data blocks. For example, each computer 110, 140 can generate a hash based on the data stored in a respective data block of a blockchain stored by another computer 110, 140. In the case the hash generated by one computer 110, 140 matches the hash stored by the other computers 110, 140 for the respective data block, the one computer 110, 140 determines the data block is verified.

The plurality of computers 110, 140 maintain the blockchain ledger 150. That is, the plurality of computers 110, 140 may receive requests from time to time to add a computer to the plurality of computers 110, 140. The computer may be, for example, an external computer from a vehicle manufacturer, a vehicle wheel assembly supplier, etc. The computers 110, 140 in the plurality of computers 110, 140 evaluate the request. In case that the request is approved, the plurality of computers 110, 140 adds the computer to the plurality of computers 110, 140 and adds a data block to the blockchain ledger 150 recording the addition.

Additionally, or alternatively, the plurality of computers 110, 140 may receive requests for transferring custody of the vehicle wheel assembly 125 from a first entity to a second entity. The computers 110, 140 evaluate the request, as described below. In the case that the request is approved, the plurality of computers 110, 140 adds a data block to the blockchain ledger 150 recording the authorization and the transfer of custody.

Each computer 110, 140 stores one copy of the blockchain ledger 150. The computers 110, 140 can be accessed via the communications network 135. The computers 110, 140 may be associated with a respective entity (e.g., a vehicle 105, a vehicle 105 manufacturer, a wheel assembly 125 supplier, a service center, etc.) that participates in maintaining the blockchain ledger 150, e.g., to verify data in the blockchain ledger 150, to store data on the blockchain ledger 150, etc. For example, the computers 110, 140 may be computing devices 140 external to the vehicle 105, and computing devices internal to the vehicle 105, e.g., the vehicle computer 110.

The computing devices 140 external to the vehicle 105 can include one or more entity computers 140. The entity computer 140 is a computing device including a processor and a memory. The entity computer 140 is maintained by the respective entity, e.g., a manufacturer of vehicles, the vehicle 105, etc. The entity computer 140 may include an identifier that identifies the entity.

The entity computer 140 may be programmed to receive data of the vehicle wheel assembly 125 from one or more sensors communicatively coupled to the entity computer 140. The sensors may be installed on, or separate from, a vehicle 105. For example, the entity computer 140 may receive image data of the vehicle wheel assembly 125 from one or more image sensors. In this situation, the entity computer 140 can analyze the image data to determine a presence or absence of structural damage to the vehicle wheel assembly 125 using image recognition techniques. As another example, the entity computer 140 may receive tire pressure data of the vehicle wheel assembly 125 from a tire pressure sensor. In this situation, the entity computer 140 can analyze the tire pressure data (e.g., whether the tire pressure remains constant or decreases) to determine a presence or absence of structural damage to the vehicle wheel assembly 125. The entity computer 140 can then transmit the data and an inspection result including a binary value representing either a presence or absence of structural damage to the vehicle wheel assembly 125 to the other computers 110, 140. The plurality of computers 110, 140 then evaluate the transmission based on an identifier of the entity computer 140. For example, the blockchain ledger 150 may store an authorized identifier that specifies an entity computer 140 authorized to provide the inspection result. In the case the identifier of the entity computer 140 matches the authorized identifier stored in the blockchain ledger 150, the plurality of computers 110, 140 authorize the transmission and store the data and the inspection result to the blockchain ledger 150.

The vehicle computer 110 is programmed to receive vehicle data from one or more sensors 115. For example, the vehicle computer 110 can receive data from one or more sensors 115, e.g., from a tire pressure sensor, a GPS, a wheel speed sensor, an image sensor, etc., for each wheel assembly 125 installed on the vehicle 105. The vehicle data may indicate, e.g., a distance travelled by the vehicle wheel assembly 125 during operation, a number of instances of repair of the vehicle wheel assembly 125, climate and/or road conditions acting on the vehicle wheel assembly 125, a thread height of the tire, tire pressure, etc. For example, the vehicle computer 110 can determine a distance traveled by the wheel assembly 125 during operation based on the distance the vehicle 105 travelled following installation of the wheel assembly 125 to the vehicle 105. The vehicle computer 110 can store the vehicle data, e.g., in a memory of the vehicle computer 110. Additionally, the vehicle computer 110 can transmit the vehicle data to the other computers 140, e.g., for storage to the blockchain ledger 150 (as discussed below).

Upon receiving the vehicle data, the plurality of computers 140 evaluate the transmission based on an identifier of the vehicle 105, e.g., a vehicle identification number (VIN). For example, the blockchain ledger 150 may store an authorized identifier that specifies a vehicle 105 authorized to provide vehicle data for the vehicle wheel assembly 125. In the case the identifier of the vehicle 105 matches the authorized identifier stored in the blockchain ledger 150, the plurality of computers 140 authorize the transmission and store the vehicle data to the blockchain ledger 150.

The computer 110, 140 maintained by at least one of the first entity and the second entity may be programmed to initiate a request to transfer custody of a vehicle wheel assembly 125 from the first entity, i.e., the entity in possession of the vehicle wheel assembly 125, to the second entity. For example, the computer 110, 140 maintained by at least one of the first entity and the second entity may be programmed to initiate a request to transfer custody of a vehicle wheel assembly 125 in response to receiving a request to transfer custody of another vehicle wheel assembly 125, i.e., to exchange vehicle wheel assemblies 125.

Additionally, or alternatively, the computer 110, 140 maintained by at least one the first entity and the second entity may be programmed to initiate the request based on the health status of the vehicle wheel assembly 125 and the identifiers of the entities, e.g., to replace an unhealthy wheel assembly 125.

The computer 110, 140 maintained by the second entity may be programmed to determine the health status of the vehicle wheel assembly 125. The health status is one of healthy or unhealthy. The vehicle wheel assembly 125 is healthy when the vehicle wheel assembly 125 can operate within predetermined thresholds. Conversely, the vehicle wheel assembly 125 is unhealthy when the vehicle wheel assembly 125 cannot perform within one or more predetermined thresholds. The predetermined thresholds may be specified by a manufacturer or a designer of the vehicle 105 and/or the vehicle wheel assembly 125 and/or determined by empirical testing. The predetermined thresholds may be determined such that the vehicle wheel assembly 125 can satisfy conventional operation on a roadway when operating within the thresholds.

The computer 110, 140 maintained by the second entity can determine the health status of the vehicle wheel assembly 125 based on the vehicle data and/or the inspection results associated with the vehicle wheel assembly 125 in the blockchain ledger 150. For example, the computer 110, 140 maintained by the second entity may query the blockchain ledger 150 to determine the inspection results associated with the vehicle wheel assembly 125. In the case the inspection results indicate a presence of structural damage to the vehicle wheel assembly 125, the computer 110, 140 maintained by the second entity determines the vehicle wheel assembly 125 is unhealthy. In the case the inspection results indicate an absence of structural damage to the vehicle wheel assembly 125, the computer 110, 140 maintained by the second entity can determine the vehicle wheel assembly 125 is healthy.

Additionally, or alternatively, the computer 110, 140 maintained by the second entity may query the blockchain ledger 150 to determine the vehicle data associated with the vehicle wheel assembly 125. The computer 110, 140 maintained by the second entity may compare the vehicle data to the predetermined thresholds to determine the health status of the vehicle wheel assembly 125.

For example, the computer 110, 140 maintained by the second entity may compare the distance travelled by the vehicle wheel assembly 125 during operation to a predetermined distance threshold, e.g., stored in the blockchain ledger 150. The distance threshold is a maximum distance the vehicle wheel assembly 125 can travel during operation and satisfy conventional operation on a roadway, e.g., 50,000 miles. The distance threshold may be determined through empirical testing to determine the maximum distance the vehicle wheel assembly 125 can travel and continue to satisfy conventional operation on a roadway. In the case the distance travelled by the vehicle wheel assembly 125 during operation is above the distance threshold, the computer 110, 140 maintained by the second entity determines the vehicle wheel assembly 125 is unhealthy. In the case the distance travelled by the vehicle wheel assembly 125 during is below the distance threshold, the computer 110, 140 maintained by the second entity may determine the vehicle wheel assembly 125 is healthy.

As another example, the computer 110, 140 maintained by the second entity may compare a thread height of threads of the tire to a predetermined height threshold, e.g., stored in the blockchain ledger 150. The height threshold is a minimum height of threads that allow the tire to satisfy conventional operation on a roadway. The height threshold may be determined through empirical testing to determine the minimum height of threads that allow the tire to satisfy conventional operation on the roadway. In the case the height of the threads is below the height threshold, the computer 110, 140 maintained by the second entity determines the vehicle wheel assembly 125 is unhealthy. In the case the height of the threads is above the height threshold, the computer 110, 140 maintained by the second entity may determine the vehicle wheel assembly 125 is healthy.

As another example, the computer 110, 140 maintained by the second entity can compare the number of instances of repair to a predetermined repair threshold, e.g., stored in the blockchain ledger 150. The repair threshold is a maximum number of instances the vehicle wheel assembly 125 can be repaired, e.g., three. The repair threshold may be determined through empirical testing to determine a number of instances of repair that allows the vehicle wheel assembly 125 to continue performing within the predetermined thresholds. In the case the number of instances of repair exceeds the repair threshold, the computer 110, 140 maintained by the second entity determines the vehicle wheel assembly 125 is unhealthy. In the case the number of instances of repair is below the repair threshold, the computer 110, 140 maintained by the second entity may determine the vehicle wheel assembly 125 is healthy.

The computers 110, 140 are programmed to vote to accept or reject the requested custody transfer. The result of the vote may be based on a majority of the computers 110, 140 in the plurality of computers 110, 140. Further, the result of the vote may be based on a weighted majority wherein each of the computers 110, 140 are assigned weights. Each computer 110, 140 may be allotted a vote with a predetermined weight (for example, stored in memory by the vehicle manufacturer). The weight may be predetermined, for example, based on the entity associated with the computer 110, 140. As an example, a computing device 140 associated with the vehicle manufacturer may have a higher predetermined weight than a computing device 140 associated with a vehicle service center.

The computers 110, 140 may evaluate the request and determine whether to accept or reject the request, i.e., how to vote on the request. The computers 110, 140 perform the evaluation based on one or more criteria. A first criterion may be whether the first entity has custody of the vehicle wheel assembly 125. For example, the computers 110, 140 may query the blockchain ledger 150 to determine that the first entity has custody of the vehicle wheel assembly 125. For example, the identifier of the entity that has custody of the vehicle wheel assembly 125 may be stored in the last data block of the blockchain ledger 150. In the case that the identifier of the first entity is stored in the last data block, i.e., the first entity has custody of the vehicle wheel assembly 125, the computers 110, 140 are programmed to authorize the custody transfer.

Additionally, or alternatively, another criterion may be the health status of the vehicle wheel assembly 125. For example, in the case that the second entity is the vehicle 105, the computers 110, 140 may be programmed to reject the request to transfer custody to the vehicle 105 based on the vehicle wheel assembly 125 being unhealthy. Conversely, the computers 110, 140 may be programmed to authorize the request to transfer custody to the vehicle 105 based on the vehicle wheel assembly 125 being healthy. As another example, in the case that the first entity is the vehicle 105, the computers 110, 140 may be programmed to reject the request to transfer custody from the vehicle 105 based on the vehicle wheel assembly 125 being healthy. Conversely, the computers 110, 140 may be programmed to authorize the request to transfer custody from the vehicle 105 based on the vehicle wheel assembly 125 being unhealthy.

Additionally, or alternatively, other criteria may be used to evaluate the request to determine whether to vote positively or negatively with respect to granting requested authorization. For example, the computers 110, 140 may maintain a list of identifiers of entity computers 140 and vehicle computers 110 that can be authorized. The computers 110, 140 may require that an identifier be supplied by the entity computer 140 and/or the vehicle computer 110 requesting a transfer of custody that appears on the list of identifiers that can be authorized and only accept requests from entity computers 140 and/or vehicle computers 110 that supply such an identifier. As another example, the entity computer 140 and/or the vehicle computer 110 may be required to supply a digital key that matches or pairs with a digital key maintained by the computers 110, 140. In the case that the entity computer 140 and/or the vehicle computer 110 supplies the digital key, the computers 110, 140 may accept the request. In a case that one or more of the criteria for acceptance by the computers 110, 140 are not met, the computers 110, 140 will vote to reject the request.

Figure 2:
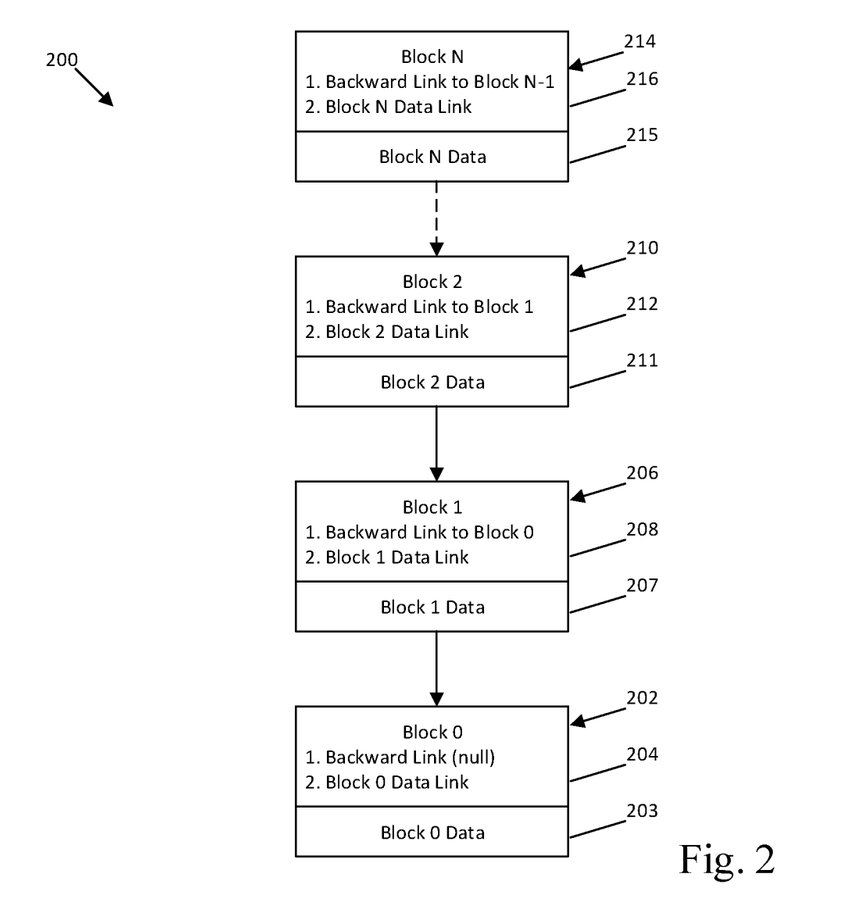
FIG. 2 is a diagram of a portion of an example electronic ledger.

FIG. 2 is an example of a blockchain 200 such as may be used for the blockchain ledger 150. The blockchain 200 includes a zero data block 202, a first data block 206, a second data block 210 and a nth data block 214. The blocks are organized in a chain. The zero data block 202 is at a first, beginning end of the chain. The first data block 206 is linked to the zero data block 202. The second data block 210 is linked to the first data block 206. Each successive data block is linked to the previous data block. The nth data block 214, at a second end of the chain, is linked to the (n−1)th data block (not shown).

Each block includes a data portion and a linking portion as shown in Table 1.

| Data Block | Data Portion | Linking Portion |
|---|---|---|
| 202 | 203 | 204 |
| 206 | 207 | 208 |
| 210 | 211 | 212 |
| 214 | 215 | 216 |

| Data Block | Data Portion | Linking Portion |
| --- | --- | --- |

The data portion 203, 207, 211, 215 includes data to be stored in the data block. The linking portion 204, 208, 212, 216 includes a link to the data portion, and, except for the zero data block, includes a link to the previous data block in the chain. For example, in the first data block 206, the data portion 207 stores data. The linking portion 208 includes a link "block 1 data link" that provides a link to the data portion 207. The linking portion 208 further includes a link "backward link to block 0" that provides a link to the linking portion of data block 0.

Figure 3:
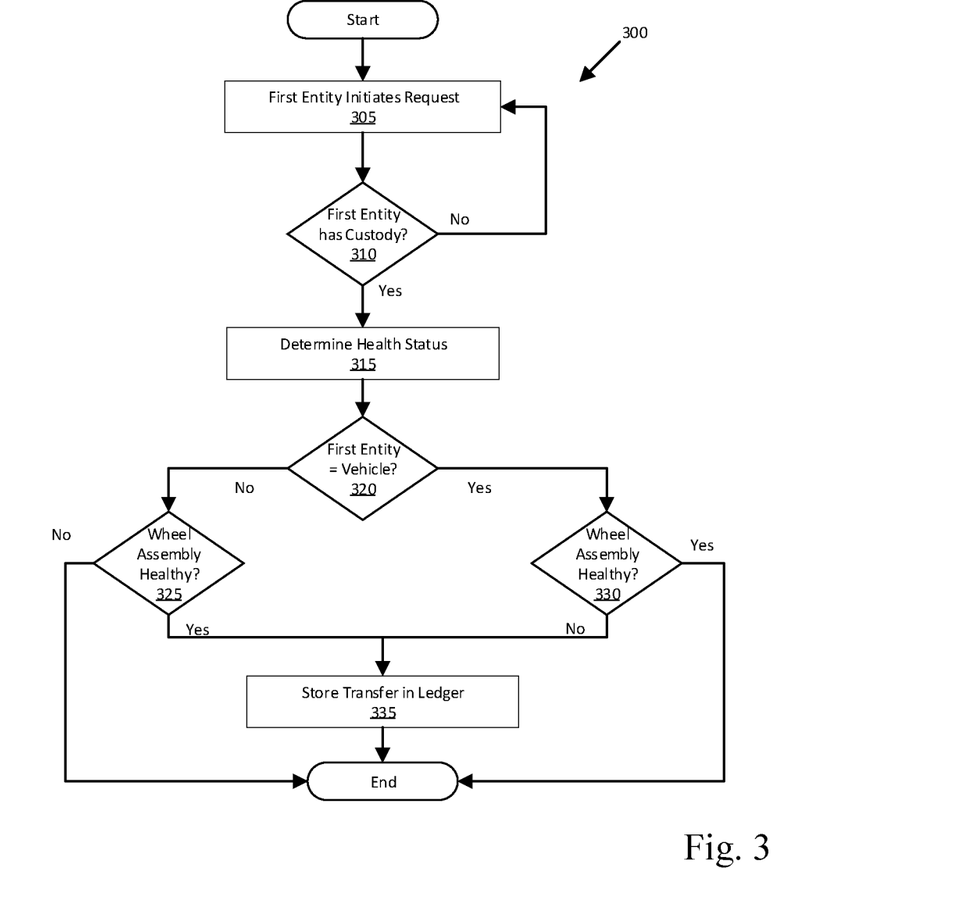
FIG. 3 is a flowchart of an example process for updating an electronic ledger.

FIG. 3 is a diagram of an example process 300 for authorizing a request to transfer custody of a vehicle wheel assembly 125 from a first entity to a second entity. The process 300 begins in a block 305.

In the block 305, the first entity or the second entity initiates a request to transfer custody of the vehicle wheel assembly 125 from the first entity to the second entity. Specifically, the computer 110, 140 maintained by one of the first entity and the second entity is programmed to initiate the request. The computer 110, 140 maintained by the respective entity may be programmed to initiate the request based on, e.g., a health status of the vehicle wheel assembly 125, in response to receiving a request to transfer custody of another vehicle wheel assembly 125, etc. The respective computer 110, 140 can transmit the request to the other computers 110, 140, e.g., via the blockchain network 111. The request includes the identifier for the first entity, an identifier for the vehicle wheel assembly 125, and the identifier for the second entity. The process 300 continues in a block 310.

In the block 310, the computer 110, 140 of the second entity determines whether the first entity has custody of the vehicle wheel assembly 125. For example, upon receiving the request from the first entity, the computer 110, 140 of the second entity may query the blockchain ledger 150 to determine whether the first entity has custody of the vehicle wheel assembly 125. The blockchain ledger 150 stores data blocks including the identifier of the vehicle wheel assembly 125 and the identifier of the entity with custody of the vehicle wheel assembly 125, as described above. In the case that the first entity has custody of the vehicle wheel assembly 125, the process 300 continues in a block 315. Otherwise, the computers 110, 140 reject the request and the process returns to the block 305.

In the block 315, the computer 110, 140 of the second entity determines the health status of the vehicle wheel assembly 125. That is, the computer 110, 140 of the second entity can determine the vehicle wheel assembly 125 is one of healthy or unhealthy. For example, the computer 110, 140 of the second entity can query the blockchain ledger 150 to determine the vehicle data and/or the inspection results stored in the blockchain ledger 150 for the vehicle wheel assembly 125. In the case the inspection results stored in the blockchain ledger 150 indicate a presence of structural damage, the computer 110, 140 of the second entity determines the vehicle wheel assembly 125 is unhealthy. In the case the inspection results stored in the blockchain ledger 150 indicate an absence of structural damage, the computer 110, 140 of the second entity can then compare the vehicle data to the one or more predetermined thresholds, as described above. In the case that the vehicle wheel assembly 125 has not been previously installed on a vehicle 105, the vehicle data is null, i.e., no data. In these circumstances, the computer 110, 140 of the second entity determines the vehicle wheel assembly 125 is healthy.

In the case that the vehicle wheel assembly 125 is, or has previously been, installed on a vehicle 105, the vehicle data is stored to the blockchain ledger 150, as described above. For example, the vehicle data can indicate, e.g., a distance travelled by the vehicle wheel assembly 125 during operation on one or more vehicles 105, a number of instances of repair of the vehicle wheel assembly 125, etc., as described above. The computer 110, 140 of the second entity can compare the vehicle data to one or more predetermined thresholds. In the case that the vehicle data is within each predetermined threshold (e.g., a threshold distance, a repair threshold, etc., as described above), the computer 110, 140 of the second entity can determine the vehicle wheel assembly 125 is healthy. Conversely, in the case that the vehicle data is outside at least one predetermined threshold, the computer 110, 140 of the second entity can determine the vehicle wheel assembly 125 is unhealthy. The process 300 continues in a block 320.

In the block 320, the computer 110, 140 of the second entity determines whether the first entity is a vehicle 105, e.g., from the request. For example, the computer 110, 140 of the second entity can identify the first entity based on the identifier of the first entity. In the case that the first entity is a vehicle 105, the process 300 continues in a block 330. Otherwise, the process 300 continues in a block 325.

In the block 325, which follows the block 320 in the case that the first entity is not a vehicle 105, the computers 110, 140 vote to authorize or reject the requested transfer of the vehicle wheel assembly 125. As described above, the vehicle wheel assembly 125 can be one of healthy or unhealthy. In the case that the vehicle wheel assembly 125 is healthy, the computers 110, 140 vote to authorize the request to transfer custody of the vehicle wheel assembly 125 from the first entity to the second entity. In the case that the vehicle wheel assembly 125 is unhealthy, the computers 110, 140 vote to reject the request to transfer custody of the vehicle wheel assembly 125 from the first entity to the second entity. The computer 110, 140 maintained by the second entity receives the votes from the other computers 110, 140 and then determines whether the custody transfer request is approved based on the number of votes authorizing the requested transfer. The result of the vote may be determined according to, e.g., a vote of a majority of the computers 110, 140, i.e., a consensus protocol, a weighted majority vote with each computer 110, 140 assigned a weight, i.e., a proof of stake, etc., as described above. In the case that the vehicle wheel assembly 125 is healthy, the computer 110, 140 maintained by the second entity authorizes the request, and the process 300 continues in a block 335. Otherwise, the computer 110, 140 maintained by the second entity rejects the request, and the process 300 ends.

In the block 330, which follows the block 320 in the case that the first entity is a vehicle 105, the computers 110, 140 vote to authorize or reject the requested transfer of the vehicle wheel assembly 125. As described above, the vehicle wheel assembly 125 can be one of healthy or unhealthy. In the case that the vehicle wheel assembly 125 is unhealthy, the computers 110, 140 vote to authorize the request to transfer custody of the vehicle wheel assembly 125 from the first entity to the second entity. In the case that the vehicle wheel assembly 125 is healthy, the computers 110, 140 vote to reject the request to transfer custody of the vehicle wheel assembly 125 from the first entity to the second entity. The computer 110, 140 maintained by the second entity receives the votes from the other computers 110, 140 and then determines whether the custody transfer request is approved based on the number of votes authorizing the requested transfer. The result of the vote may be determined according to a vote of a majority of the computers 110, 140, i.e., a consensus protocol. In the case that the vehicle wheel assembly 125 is unhealthy, the computer 110, 140 maintained by the second entity authorizes the request, and the process 300 continues in a block 335. Otherwise, the computer 110, 140 maintained by the second entity rejects the request, and the process 300 ends.

In the block 335, the blockchain ledger 150 is modified. Typically, each computer 110, 140 modifies the respective copy of the blockchain ledger 150 stored in the memory of the computer 110, 140. For example, each computer 110, 140 may add a data block to the respective copy of the blockchain ledger 150. The added data block can include a data portion including an identifier for the first and second entities, respectively, an identifier for the vehicle wheel assembly 125, and the authorization for the request to transfer custody. The data block can further include a linking portion including a link to the data portion, and a link to the most recent previous block added to the blockchain ledger 150. Following addition of the data block to the blockchain ledger 150, the process 300 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising: providing, from a sensor in a vehicle, data about a vehicle wheel assembly via a communication bus in the vehicle;
   upon receiving, from the sensor via the communication bus, data for the vehicle wheel assembly, storing in an electronic ledger the data and determining a health status of the vehicle wheel assembly based on comparing the data to a predetermined threshold, the health status being one of healthy or unhealthy;
   upon determining a vehicle has custody of the vehicle wheel assembly, sending a request via the wide area communication network to a plurality of remote computers to initiate a transfer of custody of the vehicle wheel assembly from the vehicle to an entity based on determining the vehicle wheel assembly is unhealthy;
   authorizing the transfer of custody of the vehicle wheel assembly to the entity based on a second vehicle wheel assembly being healthy, the entity having custody of the second vehicle wheel assembly;
   rejecting the transfer of custody to the entity based on the second vehicle wheel assembly being unhealthy;
   writing, to the electronic ledger, a data block indicating the transfer of custody being authorized or rejected;
   in response to the written data block, performing a verification process by each of the plurality of remote computers comprising:
      generating, by each of the plurality of remote computers, a hash based on the written data block,
      comparing, by each of the plurality of remote computers, the hash generated based on the written data block with a hash generated by the vehicle computer of the written data block;
      determining, by each of the plurality of remote computers, whether their respective generated hashes match the hash generated by the vehicle computer; and
      verifying, by each of the plurality of remote computers, the written data block based on whether the compared generated hashes match.

2. The method of claim 1, wherein the electronic ledger stores data identifying a current entity that has custody of the vehicle wheel assembly.

3. The method of claim 2, further comprising querying the electronic ledger to determine that the current entity has custody of the vehicle wheel assembly.

4. The method of claim 1, wherein the electronic ledger stores data identifying a prior entity that previously had custody of the vehicle wheel assembly.

5. The method of claim 1, further comprising;
   upon determining the entity has custody of the vehicle wheel assembly, initiating the transfer of custody for the vehicle wheel assembly from the entity to the vehicle based on determining the vehicle wheel assembly is healthy;
   authorizing the transfer of custody to the vehicle based on the second vehicle wheel assembly being healthy, the vehicle having custody of the second vehicle wheel assembly; and
   rejecting the transfer of custody to the vehicle based on the second vehicle wheel assembly being unhealthy.

6. The method of claim 1, further comprising preventing the transfer of custody from the vehicle based on the vehicle wheel assembly being healthy.

7. The method of claim 1, further comprising determining the health status based additionally on detecting, via image data including the vehicle wheel assembly, a presence or absence of structural damage to the vehicle wheel assembly.

8. A system for a vehicle, comprising: a sensor arranged to provide data about a vehicle wheel assembly via a communication bus in the vehicle;
   a vehicle computer arranged to receive the data about the vehicle wheel assembly via the communication bus and to communicate with a plurality of remote computers via a wide area communication network, the vehicle computer including a processor and a memory, the memory storing instructions executable by the processor to:
   upon receiving, from the sensor, data for the vehicle wheel assembly, store in an electronic ledger the data and determine a health status of the vehicle wheel assembly based on comparing the data to a predetermined threshold, the health status being one of healthy or unhealthy;
   upon determining a vehicle has custody of the vehicle wheel assembly, send a request via the wide area communication network to the plurality of remote computers to initiate a transfer of custody of the vehicle wheel assembly from the vehicle to an entity based on determining the vehicle wheel assembly is unhealthy;
   authorize the transfer of custody to the entity based on a second vehicle wheel assembly being healthy, the entity having custody of the second vehicle wheel assembly;
   reject the transfer of custody to the entity based on the second vehicle wheel assembly being unhealthy; and
   write, to the electronic ledger, a data block indicating the transfer of custody being authorized or rejected;
   wherein, in response to the written data block, each of the plurality of remote computers:
      generates a hash based on the written data block,
      compares the hash generated based on the written data block with a hash generated by the vehicle computer of the written data block;
      determines whether their respective generated hashes match the hash generated by the vehicle computer; and
      verifies by each of the plurality of remote computers, the written data block based on whether the compared generated hashes match.

9. The system of claim 8, wherein the electronic ledger stores data identifying a current entity that has custody of the vehicle wheel assembly.

10. The system of claim 9, wherein the instructions further include instructions to the electronic ledger to determine that the current entity has custody of the vehicle wheel assembly.

11. The system of claim 8, wherein the electronic ledger stores data identifying a prior entity that previously had custody of the vehicle wheel assembly.

12. The system of claim 8, wherein the instructions further include instructions to:
 upon determining the entity has custody of the vehicle wheel assembly, initiate the transfer of custody for the vehicle wheel assembly from the entity to the vehicle based on determining the vehicle wheel assembly is healthy;
 authorize the transfer of custody to the vehicle based on the second vehicle wheel assembly being healthy, the vehicle having custody of the second vehicle wheel assembly; and
 reject the transfer of custody to the vehicle based on the second vehicle wheel assembly being unhealthy.

13. The system of claim 8, wherein the instructions further include instructions to prevent the transfer of custody from the vehicle based on the vehicle wheel assembly being healthy.

14. The system of claim 8, wherein the instructions further include instructions to determine the health status based additionally on detecting, via image data including the vehicle wheel assembly, a presence or absence of structural damage to the vehicle wheel assembly.

15. The method of claim 1, further comprising determining the vehicle wheel assembly is a) healthy based on the data being within the predetermine threshold, or b) unhealthy based on the data being outside the predetermined threshold.

16. The method of claim 5, further comprising preventing the transfer of custody from the entity based on the vehicle wheel assembly being unhealthy.

17. The method of claim 7, further comprising determining the vehicle wheel assembly is a) healthy based on detecting no structural damage to the vehicle wheel assembly, or b) unhealthy based on detecting structural damage to the vehicle wheel assembly.

18. The system of claim 8, wherein the instructions further include instructions to determine the vehicle wheel assembly is a) healthy based on the data being within the predetermine threshold, or b) unhealthy based on the data being outside the predetermined threshold.

19. The system of claim 12, wherein the instructions further include instructions to prevent the transfer of custody from the entity based on the vehicle wheel assembly being unhealthy.

20. The system of claim 14, wherein the instructions further include instructions to determine the vehicle wheel assembly is a) healthy based on detecting no structural damage to the vehicle wheel assembly, or b) unhealthy based on detecting structural damage to the vehicle wheel assembly.

* * * * *